United States Patent [19]
Rentz

[11] Patent Number: 5,163,004
[45] Date of Patent: Nov. 10, 1992

[54] POSITION TRACKING SYSTEM

[75] Inventor: Mark L. Rentz, Torrance, Calif.

[73] Assignee: Cartesian Devices, Claremont, Calif.

[21] Appl. No.: 639,989

[22] Filed: Jan. 11, 1991

[51] Int. Cl.⁵ .............................................. G01S 1/30
[52] U.S. Cl. .................... 364/460; 364/452; 342/451
[58] Field of Search ............... 364/452, 460; 342/450, 342/451, 46, 49

[56] References Cited

U.S. PATENT DOCUMENTS

| | | | |
|---|---|---|---|
| 3,150,372 | 9/1964 | Groth, Jr. | 364/452 |
| 3,611,368 | 10/1971 | Crownover et al. | 343/6 R |
| 3,868,691 | 2/1975 | Miller et al. | 364/452 |
| 3,868,692 | 2/1975 | Woodard et al. | 342/458 |
| 3,916,410 | 10/1975 | Elwood | 364/452 |
| 4,113,382 | 9/1978 | Freudenschuse | 356/5 |
| 4,297,700 | 10/1981 | Nard et al. | 343/6.5 R |
| 4,350,983 | 9/1982 | Blaha et al. | 364/452 |
| 4,396,918 | 8/1983 | Wallis | 364/452 |
| 4,547,777 | 10/1985 | Lamiraux | 364/452 |
| 4,689,781 | 10/1987 | Cockerall, Jr. | 364/561 |
| 4,703,444 | 10/1987 | Storms, Jr. et al. | 364/561 |
| 4,757,315 | 7/1988 | Lichtenberg et al. | 342/125 |
| 4,774,518 | 9/1988 | Fukuhara | 342/389 |

Primary Examiner—Thomas G. Black
Attorney, Agent, or Firm—John Holtrichter, Jr.

[57] ABSTRACT

The present invention is an improved position tracking system utilizing at least three cw transmitting stations generally symmetrically disposed about an area of interest, and also including a mobile receiving station receiving the transmitted signals, converting the received signals to a common frequency, and comparing the phase difference between the converted signals to produce and output signal indicating the location of the mobile station relative to any desired point or points in the area of interest.

21 Claims, 4 Drawing Sheets

POSITION TRACKING SYSTEM

TECHNICAL FIELD

This invention relates to the field of position indicating systems, and more particularly to a position tracking system utilizing a plurality of cw transmitting stations generally symmetrically dispersed about an area of interest, and in which a mobile receiving station utilizes signals from the transmitting stations to determine the location of the mobile station in the area of interest and/or the distance from the mobile unit to a predetermined location in the interest area.

BACKGROUND ART

Over the years, many schemes have been developed in order to determine the location of a portable or mobile unit within a defined area or to determine the distance of the mobile unit to a predetermined location in the aforementioned area.

An example of one class of such a system is described in U.S. Pat. No. 3,611,368. This patent shows an electronic distance finder ranging system that uses resonance between two transmitting stations as a distance sensitive factor. Also in this class is U.S. Pat. No. 4,113,382, which concerns a system for measuring the distance between a master transmitting station and a slave station by determining the transmit time of a pulse of optical or electromagnetic radiation between two locations.

The prior art also includes U.S. Pat. No. 4,297,700 which describes a system for measuring distance by transmitting a VHF wave train incorporating a complicated digital ranging code, and requires a very wide bandwidth for better resolution. Further, U.S. Pat. No. 4,698,781 concerns an electronic system wherein signal arrival times or bearings are used to provide distances from a portable interrogation unit to a specified location on a field encompassed by triangularly-disposed slave and master transmitting positions.

Another one-dimensional (distance) measuring system is described in U.S. Pat. No. 4,757,315, wherein sub-radio frequency comparisons of phase differences are made, and requires a transmitter/receiver at the end of each location to which a range measurement is desired.

In all of the above-described prior art schemes, it is required that the mobile or portable unit both receive signals from and transmit signals to fixed stations. Thus, all the mobile or portable units must carry relatively large power supplies to power their mobile transmitters, and additional transmitter frequency allocations are required for additional mobile units.

In another class of prior art ranging or location-determining systems, where the mobile station has no transmitter, U.S. Pat. No. 3,868,692 describes a golf yardage finder which allows golfers to determine the distance of their next shot while approaching a green. This system uses signal strength measurements to make this determination, and is one-dimensional. It also is rather complicated in that it must deal with 18 different frequencies, one for each hole in a standard golf course. Also, in this latter class, U.S. Pat. No. 4,703,444 concerns a digital system to produce digital ranging signals. Each of a plurality of fixed transmitters transmits a repetitive ranging signal. The ranging signal pulses from the respective fixed transmitters are sequentially staggered in a predetermined order to define repetitive sets of sequentially spaced ranging signal pulses which may be processed by a portable receiving unit to determine the ranging information desired.

Unlike the first described class of prior art ranging systems that require a portable unit to both transmit and receive rf or light energy signals, the present invention only utilizes a receiver carried by the portable or mobile unit. This lessens the weight, complexity, and expense of the system.

Also, in contrast to the last described class of prior art ranging systems, the present invention does not rely on inherently inaccurate signal strength comparisons or complicated ranging coded signals to produce the desired ranging information. In fact, no prior art system known to the inventor describe a system wherein only uninterrupted continuous wave (cw) signals are transmitted by fixedly located rf transmitting stations to a mobile or portable receiving-only unit which compares the phase differences of the cw signals to provide the desired location and ranging information.

The important phase comparison feature of the present invention is, however, used in what is well known as the OMEGA Navigation system. In the OMEGA system, the various fixed location transmitters do not transmit continuously, but rather transmit alternately so that the receiving unit must remember the phase of each of the different received signals to allow a comparison to be made.

In contradistinction to the prior art, the present invention is a dependable, accurate and ultra-functional solution to the problems raised in the prior art structures.

SUMMARY OF THE INVENTION

In view of the foregoing factors and conditions characteristic of the prior art, it is a primary object of the present invention to provide a new and improved position tracking system.

Another object of the present invention is to provide a relatively simple yet effective position tracking system that utilizes a receive-only mobile unit.

Still another object of the present invention is to provide a unique position tracking system that simultaneously compares the phase difference between three like-frequency signals, two of which signals originally being transmitted at a frequency different from the third signal and from each other.

Yet another object of the present invention is to provide a flexible and useful position tracking system that allows a mobile receiving-only station to produce a range indication to the next green of interest on a golf course.

Still a further object of the invention is to provide a low cost yet accurate distance and position indicating system for use by golfers on a golf course.

Another object of the invention is to provide a highly accurate, position tracking system that is useful as a navigation aid in boating, as a location aid in amusement parks and ski resorts, and that exhibits an accuracy to plus or minus 1 meter up to a 20 mile range.

In accordance with the present invention, at least three continuous-wave (cw), simultaneously-transmitting radio frequency transmitting stations are disposed in spaced relation to each other, one of which stations generating a signal at a first fixed frequency, and the other transmitting stations each generating a signal at a fixed frequency differing therefrom and from each other. The invention also includes a mobile receiving station simultaneously receiving the different frequency signals and responsive thereto to convert each frequency signal to a common frequency and simultaneously comparing the phase difference therebetween to produce an output signal indicative of the location of the mobile receiving station relative to the location of the transmitting stations.

In accordance with an embodiment of the invention, the mobile receiving station converts each frequency signal differing from the first frequency to the first frequency and simultaneously compares the phase difference therebetween to produce the output signal.

The features of the present invention which are believed to be novel are set forth with particularity in the appended claims. The present invention, both as to its organization and manner of operation and use, together with further objects and advantages thereof, may best be understood by making reference to the following description taken in conjunction with the accompanying drawings in which like reference characters refer to like elements in the several views.

DESCRIPTION OF THE PREFERRED EMBODIMENT

The present invention is based on the propagation speed of radio signals. First, consider the case of just two fixed cw transmitting stations located at different points in a given area, both transmitting stations transmitting at a frequency, $f_1$. If an observer (receiver) is located at a fixed spot and observes the waves from one transmitting station and compares it to the other, the phase difference between these two waves will not change. This is because they are at exactly the same frequency. If this fixed phase difference is plotted for every point in the area, a standing wave interference pattern is created. Lines of constant phase difference will have the shape of hyperbolas such as $H_1$.

By simply setting up two transmitters at $f_1$, it will be impossible to extract the interference pattern that is desired. This is because the two signals will add together, making it impossible to extract the phase difference.

One solution is to pulse one transmitter on, then the other. If the receiver can remember the phase state between pulses, a phase comparison may be made. The aforementioned Omega Navigation system uses this time sequencing of transmitting stations.

The solution in accordance with the present invention is to have both transmitting stations continuously transmitting, but a different frequencies, $f_1$, and $f_2$. Since the phase difference of two different frequencies can not be measured, the $f_2$ frequency is converted in the receiver to $f_1$, and the phases are compared and the difference measured. Although the two transmitted signals will still be added together, the use of electrical frequency-selective filters in the receiver will keep them separate for purposes of phase comparison.

The advantage of this system over the prior art are:
1. High accuracy. Accuracy is largely based on the phase comparison step, which can be done easily. No high speed counter, or the like, are required.
2. Narrow bandwidth. All transmitted signals are cw. Bandwidth can be made arbitrarily narrow by improving the quality of the transmitter oscillators.

The above example dealt with a "one dimensional" case; finding which hyperbola the receiver is on. To find the location of a point on a plane, another transmitting station must be used. This will locate the receiver on a second hyperbola, $H_2$. Finding the intersection of the two hyperbolas will then provide the actual receiving point on the plane or area of interest.

Figure 1:
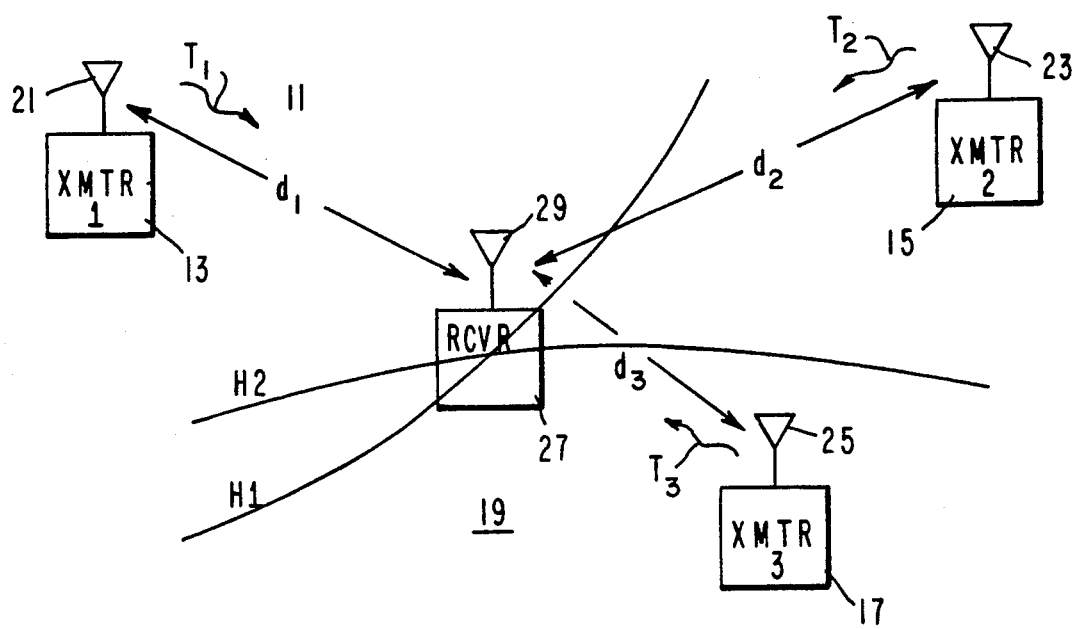
FIG. 1 is a block diagrammatic illustration of the basic components of the position tracking system geographically disposed in an area of interest such as a golf course, in accordance with the present invention.

Referring now to the drawings and more particularly to FIG. 1, there is shown a position tracking system 11 in accordance the present invention. This system includes a master transmitting station 13, a first slave transmitting station 15, and a second fixed slave transmitting station 17. It will be noted that the fixed transmitting stations 13, 15, and 17 are generally symmetrically spaced about an area of interest such as a golf course 19, in a generally triangular configuration.

The master transmitter 13 transmits its constant cw signal $T_1$ at a fixed frequency $f_1$ from its antenna 21, while the slave transmitters 15 and 17 each transmit a constant cw signal ($T_2$ and $T_3$ from respective antennas 23 and 25) at a fixed frequency offset from $f_1$ by a different constant frequency. This may be obtained by using any conventional technique. For example, the first slave transmitting station 15 may include a conventional receiver/frequency synthesizer circuit (not shown), which responds to the $f_1$ frequency and multiplies that frequency to $f_1(1+1/n_1)$, where $n_1$ is an integer. As an example, if $f_1 = 50$ MHz and $n_1 = 25$, then the first slave station will transmit a constant cw signal $T_2$ at a frequency of 52 MHz. Similarly, the second slave transmitting station 17 is designed to transmit its signal, $T_3$ at a frequency $f_1(1+1/n_2)$, where $n_2$ is an integer other than $n_1$.

Figure 2:
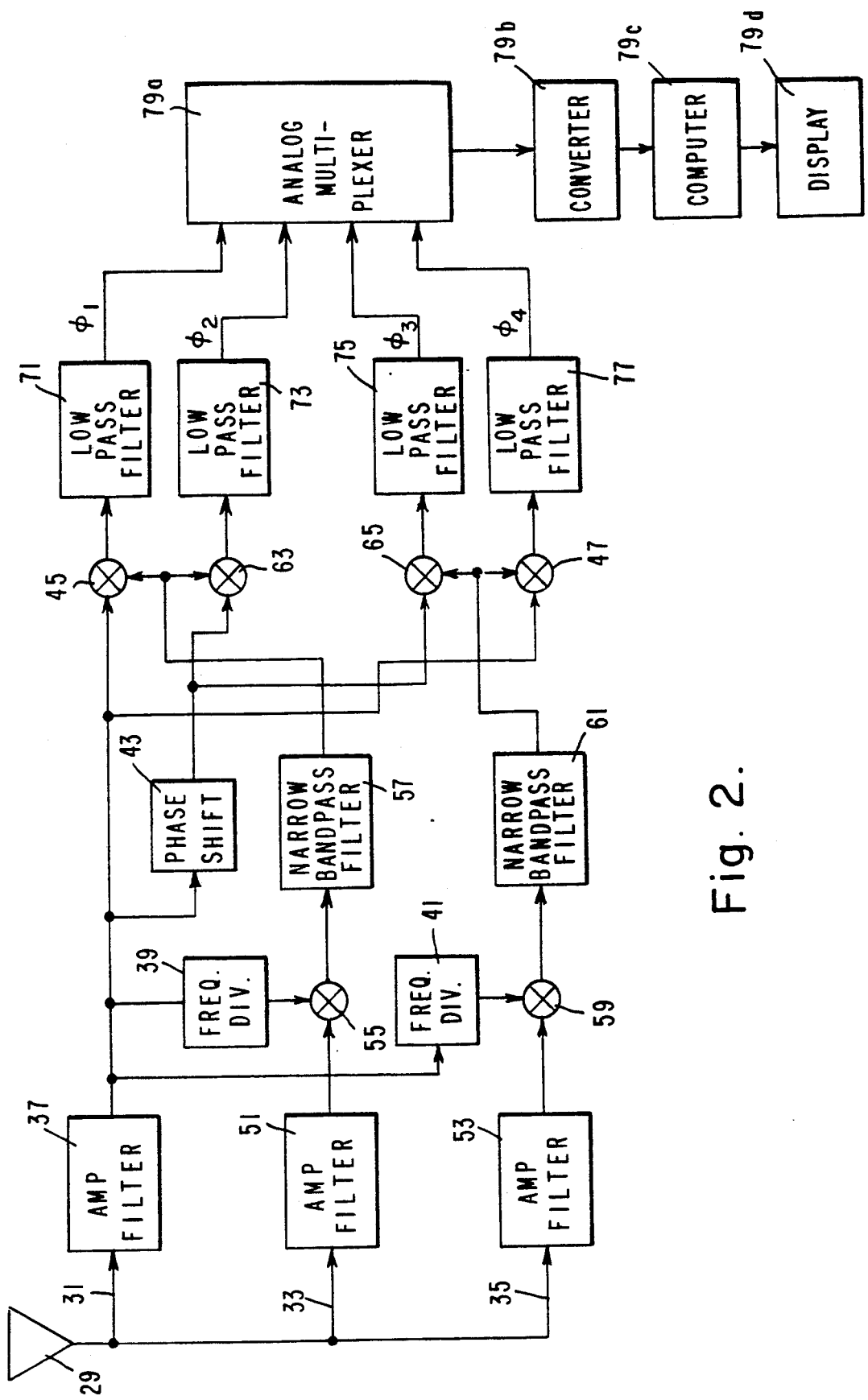
FIG. 2 is a block diagram of a mobile receive-only station shown in FIG. 1, in accordance with an embodiment of the present invention.

As seen in FIG. 2, the system 11 also includes a mobile or transportable receiving station 27 located within the boundaries of the area of interest 19. The receiver 27 receives signals $T_1$, $T_2$, and $T_3$ via an aerial 29, and splits these signals into three separate paths 31, 33, and 35.

In the first path 31, the signal is coupled into a conventional amplifier-filter element 37. The filter section of the element 37 has a very narrow bandpass centered about $f_1$, and the output from this element is coupled to a conventional divide-by-$n_1$ frequency divider 39, a divide-by-n frequency divider 41, a conventional +90° phase shift network 43, a conventional first multiplier 45, and a second multiplier 47.

In the second path 33, the signal is coupled into a conventional amplifier-filter element 51, the filter section of which has a bandpass centered at $f_1(1+1/n_1)$. The bandwidth of this filter section is not critical.

The third path 35 leads to an element 53 which is similar to element 51, but has a bandpass centered at $f_1(1+1/n_2)$.

The divide-by-$n_1$ circuit 39 responds to its input signal at $f_1$ and performs a digital frequency division to give $f_1/n_1$ which is multiplied in a conventional mixer circuit 55 by the output of the element 51. The mixing in circuit 55 results in two frequencies, $f_1$ and $f_1(1+2/n_1)$. A conventional narrow bandpass filter circuit 57 suppresses the $f_1(1+2/n_1)$ term and other interference. In a like manner, mixer circuit 59, having inputs coupled to the output of element 53 and the divide-by-$n_2$ circuit 41 to provide an output fed to a second narrow bandpass filter 61, but $f_1$ and $f_1(1+2/n_2)$ are intermediate terms.

As noted previously, the output from the element 37 is coupled to the multipliers 45 and 47, while the output from the phase shift network is coupled to conventional multipliers 63 and 65. Also, the output from the filter 57 is coupled simultaneously to second inputs of the multipliers 45 and 63, while the output from filter 61 is coupled simultaneously to second inputs of the multipliers 47 and 65. The mixer circuits 55 and 59, and the multiplier circuits 45, 47, 63, and 65 may be implemented by the use of conventional double-balanced mixer circuits.

It will now be noticed from FIG. 2 that the outputs from the four multipliers 45, 63, 65, and 47 are coupled to associated conventional low pass filters 71, 73, 75, and 77, to create an effective phase comparator function that produces, respectively, signals $\phi_1$, $\phi_2$, $\phi_3$, and $\phi_4$.

The above operation can be explained mathematically as follows:

The output of element 37 may be expressed as:

$$s_1(t) = \sin\left[2\pi f_1\left(t - \frac{d_1}{c}\right)\right]$$

where:
t = time
$f_1$ = frequency of transmitter station 13
$d_1$ = distance from station 13 to receiver 27 (see FIG. 1)
c = speed of light.

The output of filter 57 may be expressed as:

$$s_2(t) = \cos\left[2\pi f_1\left(t + \frac{d_1}{n_1 c} - \frac{(n_1 + 1)d_2}{n_1 c}\right)\right]$$

where: $d_2$ = distance from station 15 to the receiver 27.

The output of the multiplier 45 is:

$$s_1(t)s_2(t) =$$

$$\sin\left[2\pi f_1\left(\frac{t - d_1}{c}\right)\right]\cos\left[2\pi f_1\left(t + \frac{d_1}{n_1 c} - \frac{(n_1 + 1)d_2}{n_1 c}\right)\right].$$

which results in a $2f_1$ term and a dc (direct current) term. The low pass filter 71 function removes the $2f_1$ term, leaving:

$$\phi_1 = \sin\left[\frac{2\pi f_1(n_1 + 1)}{n_1 c}(d_2 - d_1)\right].$$

after considerable expansion and combining of terms. Replacing $f_1/c = 1/\lambda_1$, where $\lambda_1$ is the wavelength of $f_1$:

$$\phi_1 = \sin\left[\frac{2\pi(n_1 + 1)}{n_1\lambda_1}(d_2 - d_1)\right]$$

The output of the phase shifter 43 is:

$$s_{1q}(t) = \cos\left[2\pi f_1\left(t - \frac{d_1}{c}\right)\right]$$

$$\phi_2 = \cos\left[2\pi f_1\frac{(n_1 + 1)}{n_1 c}(d_2 - d_1)\right]$$

$$\phi_2 = \cos\left[2\pi\frac{(n_1 + 1)}{n_1\lambda_1}(d_2 - d_1)\right].$$

By a similar process, $$\phi_3 = \cos\left[2\pi\frac{(n_2 + 1)}{n_2\lambda_1}(d_3 - d_1)\right], \text{ and}$$

$$\phi_4 = \sin\left[2\pi\frac{(n_2 + 1)}{n_2\lambda_1}(d_3 - d_1)\right].$$

Examining $\phi_1$, it can be seen that it depends only on $d_2 - d_1$, since all other terms are constants in this system. Knowing $d_2 - d_1$ locates the receiver to a hyperbola. But $\phi_1$ is the sine of $d_2 - d_1$, so that knowing $\phi_1$ will locate the receiver to a set of hyperbolas. If the receiver moves in a fixed direction, it can count the cycles of $\phi_1$ and then determine the argument, $d_2 - d_1$. This process requires starting from a known position.

To gain direction sensitivity, $\phi_2$ is introduced. By the following algorithm, $d_2 - d_1$ may be known:
1. $\phi_1$ decreases, $\phi_2 > 0 \rightarrow d_2 - d_1$ decreasing.
2. $\phi_1$ decreases, $\phi_2 < 0 \rightarrow d_2 - d_1$ increasing.
3. $\phi_1$ increases, $\phi_2 > 0 \rightarrow d_2 - d_1$ increasing.
4. $\phi_1$ increases, $\phi_2 < 0 \rightarrow d_2 - d_1$ decreasing.

It should thus be clear that by tracking $\phi_3$ and $\phi_4$ in a similar manner, $d_3 - d_1$ may be known. This defines another hyperbola between transmitting station 13 and transmitting station 17.

Computing the intersection of two hyperbolas, $H_1$ and $H_2$ by conventional computer programming means yields the position of the receiver 27. It is true that two hyperbolas will sometimes have multiple intersections, but since this system tracks continuously, it is simple to discard the incorrect intersections.

As seen in FIG. 2, the phase difference signals, $\phi_1$ through $\phi_4$, from the low pass filter a coupled to a conventional user-useful output circuit arrangement 79 comprising a conventional analog multiplexer circuit 79a, an analog-to-digital converter circuit 79b, a conventional pre-programmed microcomputer 79c, and a conventional digital visual display, 79d. The visual display, for example, may show the x - y coordinates of the receiver's location. The circuit arrangement 79 is well known in the art and will, therefore, not be described here in detail. Hyperbola intersection navigation with computer-aided circuitry is widely used in the art.

Figure 3:
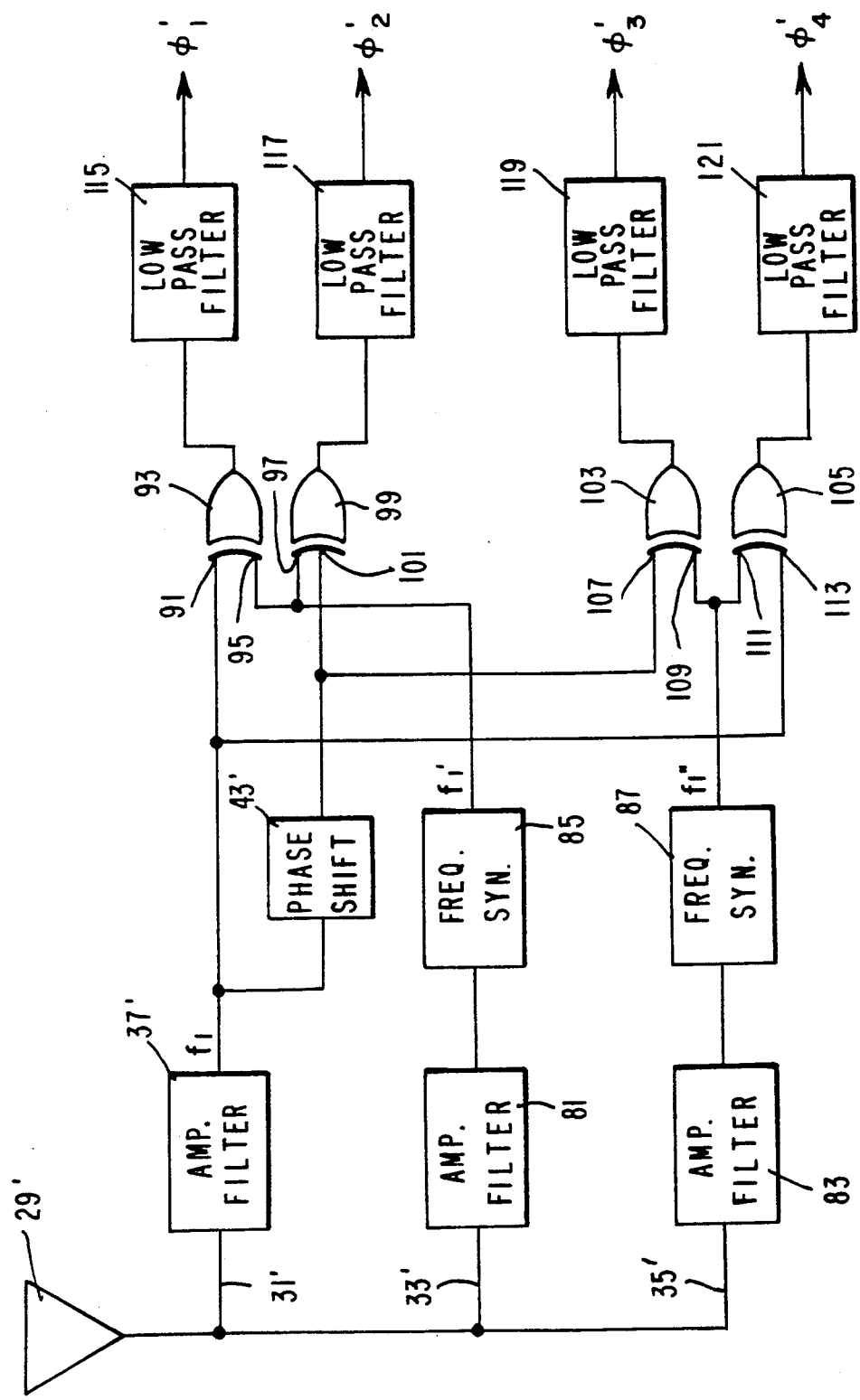
FIG. 3 is a block diagram of still another embodiment of the invention which incorporates a frequency synthesizer to provide three signals of the same frequency for phase comparison.

In accordance with another embodiment of the present invention, shown if FIG. 3, a receiving station 27' includes an aerial 29' to receive signals $T_1$, $T_2$, and $T_3$. As in the first described embodiment, these signals are split into three different paths 31', 33', and 35'.

Following the first path, the signals received on the aerial 29' are coupled to the input of an amplifier-filter element 37' that is similar to the one shown in FIG. 2. That is, the signal is amplified and goes through a very narrow bandpass filter centered about $f_1$.

Unlike the first embodiment, the second path 33' leads to an amplifier-filter element 81 that is similar in function to the element 37', but the narrow filter section of this element is centered about $f_1(1+1/n_1)$ Likewise, an amplifier-filter element 83 is coupled to the third path 35' and includes a very narrow bandpass filter section that is centered about a frequency, $f_1(1+1/n_2)$. Thus, the output of element 37' is $f_1$, the output of element 81 is $f_1(1+1/n_1)$, and that of element 83 is $f_1(1+1/n_2)$.

The output of element 81 is coupled to a conventional frequency synthesizer 85 which divides the signal by a factor of $(1+1/n_1)$ to create the frequency $f_1'$. Such a synthesizer may be implemented by a conventional phase locked loop circuit, as is well known in the art. In a similar manner, the output of element 83 is coupled to a similar frequency synthesizer 87, but which divides by a factor of $(1+1/n_2)$ to produce the frequency $f''$.

At the same time, the $f_1$ signal output from the element 37' is coupled to a conventional $+90°$ phase shift network 43', and to a first input 91 of a conventional first exclusive OR gate 93. A second input 95 of the gate 93 is coupled to a first input 97 of a second exclusive OR gate 99 and also to the output of the first synthesizer 85.

The output of the phase shift network 43' is coupled to a second input 101 of the second gate 99. A third exclusive OR gate 103 and a fourth exclusive OR gate 105 are also provided. A first input 107 of gate 103 is connected to the second input 101 of the second gate, and its second input 109 is connected to the output of the second synthesizer 87 and to a first input 111 of the fourth gate 105. Finally, a second input 113 of the fourth gate is connected to the first input 91 of the first gate 93.

It will be noted that the outputs of each of the gates 93, 99, 103, and 105 are respectively connected to inputs of associated conventional low pass filters 115, 117, 119, and 121, which associated combinations constitute phase detectors to produce respective outputs $\phi_1'$, $\phi_2'$, $\phi_3'$, and $\phi_4'$.

Figure 4:
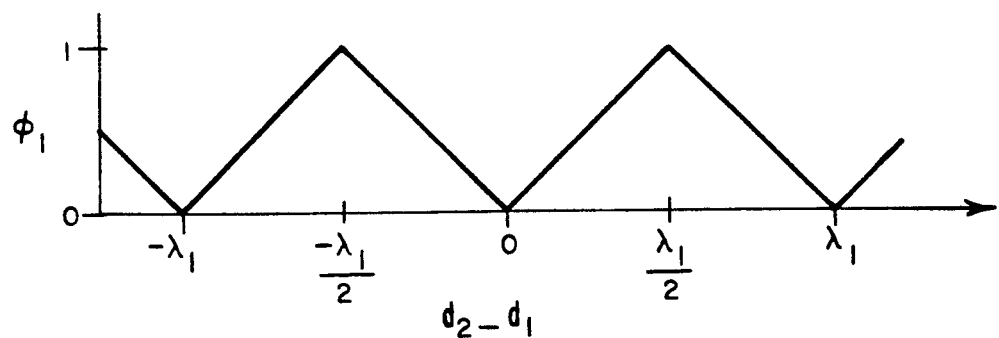
FIG. 4 is a graph showing $\phi_1$ as a function of $d_2-d_1$.
Figure 5:
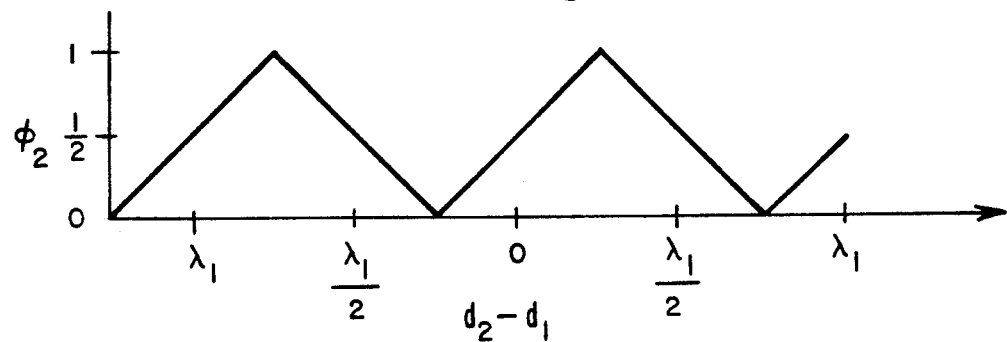
FIG. 5 is a graph showing $\phi_2$ as a function of $d_2-d_1$.

The graph of FIG. 4 shows $\phi_1'$ as a function of $d_2-d_1$, where $\lambda_1$ is the wavelength of frequency $f_1$. And, the graph of FIG. 5 shows $\phi_2'$ as a function of $d_2-d_1$. Thus, when $\phi_2'$ is used in conjunction with $\phi_1'$, the direction in which the receiver happens to be moving may be determined.

Figure 6:
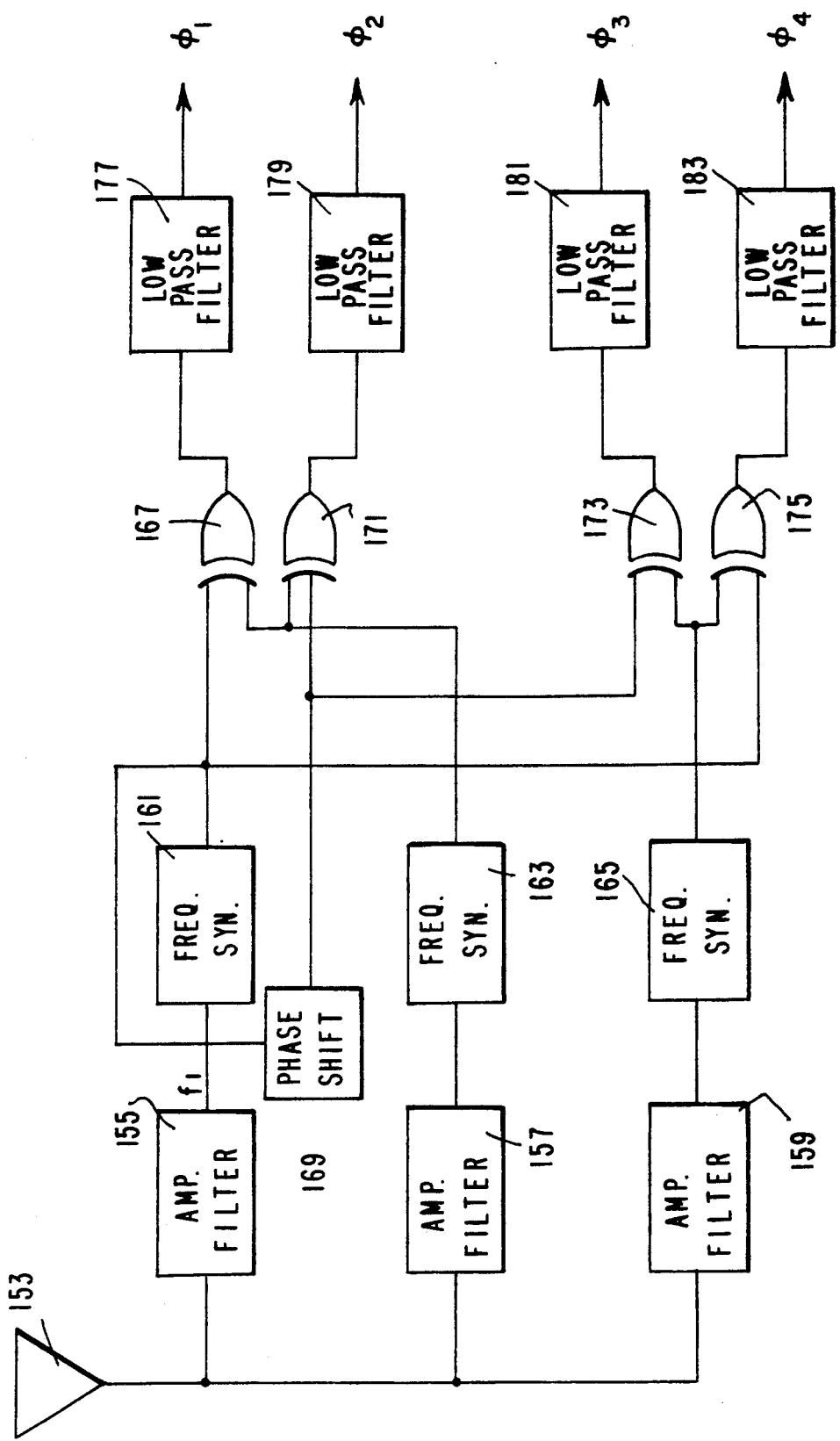
FIG. 6 is a block diagram of yet another embodiment of the invention wherein phase comparison is at a common frequency not necessarily that of any one of the transmitting stations.

In accordance with yet another embodiment of the present invention, shown in FIG. 6, a position tracking system includes a receiving station 151 including a receiving antenna 153 that couples signals $T_1$, $T_2$, $T_3$ received from the transmitting stations shown in FIG. 1 to three amplifier-filter elements 155, 157, 159 that are similar to the amplifier-filter elements of FIG. 3. The amplifier-filter elements are each coupled to an associated frequency synthesizer 161, 163 165 that are again similar to the frequency synthesizers of FIG. 3. Thus, in this embodiment, the three different frequencies received at the antenna 153 are all converted to a common, fourth frequency $f_4$.

The output from the first frequency synthesizer 161 is coupled to one of two inputs of a first exclusive OR gate 167, and also to a $+90°$ phase shift network 169 that is similar to the network 43 of FIG. 2, and which performs the same function except for the frequency. The output of the network 169 is coupled to one of the inputs of a second exclusive OR gate 171 and also to an input of a third exclusive OR gate 173. The output of the second frequency synthesizer 163 is simultaneously coupled to an input of the first and second gates, 167 and 171, respectively. Also, the $f_4$ output of the third frequency synthesizer 165 is coupled to an input of the third gate 173 and to an input of a fourth exclusive OR gate 175, the second input of the latter gate being coupled to the $f_4$ output of the first frequency synthesizer 161.

The outputs of the four gates 167, 171, 173, and 175 are coupled through associated conventional low pass filters, respectively identified by reference numerals 177, 179, 181 and 183, to provide the aforementioned phase difference signals, namely, $\phi_1$, $\phi_2$, $\phi_3$, and $\phi_4$. It will be here noted that this embodiment of the invention is similar to that described with respect to FIG. 3, but includes the frequency synthesizer 161 which converts the $f_1$ signal output of the element 155 to the common frequency $f_4$. Also, the $+90°$ phase shifter 169 provides the proper phase shift of $f_4$ output of the synthesizer 161 to an input of the second gate 171.

The common frequency, $f_4$, can be any suitable frequency and, of course, the common frequency can be equal to any one of the frequencies of the transmitting stations. In other words, $f_4$ can equal $f_1$, for example, to provide the same operation as the first two described embodiments of the invention.

It should be here noted that although two of the embodiments of the mobile receiver described above used different phase detector implementations, either implementation may be used in any receiver embodiment of the present invention.

It should be clear from the preceding description of the invention that there has been described a new and improved position tracking system that is simple yet accurate and less costly than the prior art systems described previously.

Although the invention has been described in detail with respect to presently preferred embodiments of the invention, it should be understood that the invention may be practiced using similar functioning but different elements, under the scope of the appended claims. For example, the invention could be applied as a navigation aid in a boat harbor, as a location determining device in an amusement park or in a ski resort, and the like. In this regard, it has been determined that the inventive system has a range of up to about 20 miles and an accuracy of about ±1 meter. Also, it should be noted that the constant difference between the frequencies transmitted by the three transmitting stations may be obtained by conventional means other than by the use of receiver/synthesizer circuitry.

What is claimed is:

1. A position tracking system, comprising:
   at least three continuous-wave, simultaneously-transmitting radio frequency transmitting stations disposed in spaced relation to each other, one of which stations generating a signal at a first fixed frequency, and the other transmitting stations each generating a signal at a fixed frequency differing therefrom and from each other; and a mobile receiving station simultaneously receiving the different frequency signals and responsive thereto to convert each frequency signal differing from said first frequency to said first frequency and simultaneously comparing the phase difference therebetween to produce an output signal indicative of the location of said mobile receiving station relative to the location of said transmitting stations.

2. The position tracking system according to claim 1, wherein said other transmitting stations are offset from the frequency of said one of said transmitting stations by a different constant frequency.

3. The position tracking system according to claim 1, wherein said one of said transmitting stations is a master transmitting station transmitting at a fixed frequency offset $f_1$, and wherein said other transmitting stations are slave transmitting stations transmitting at a fixed frequency offset from said $f_1$ frequency by a different constant frequency.

4. The position tracking system according to claim 3, wherein said slave transmitting stations include receiver/frequency synthesizer circuits responsive to said $f_1$ frequency.

5. The position tracking system according to claim 4, wherein said slave transmitting stations multiply the frequency $f_1$ to $f_1(1+1/n)$, where n for each of said slave stations is a different integer.

6. The position tracking system according to claim 1, wherein said mobile receiving station includes two signal paths each including frequency converting means for converting signals received from said other transmitting stations to said first fixed frequency.

7. The position tracking system according to claim 6, wherein said frequency converting means includes divide-by-n circuits.

8. The position tracking system according to claim 6, wherein said frequency counting means includes a frequency synthesizer circuit dividing an input signal by a factor of $(1+1/n)$, where n is an integer representing the offset of an associated transmitter frequency from the frequency of said signal generated by said one transmitting station.

9. The position tracking system according to claim 6, wherein said receiving station includes phase comparison means for comparing the phase difference between all said signals at said first fixed frequency.

10. The position tracking system according to claim 9, wherein said mobile receiving station includes an output circuit having an analog multiplexer coupled to an analog-to-digital converter producing a digital computer input signal, and wherein said phase comparison means produces phase difference signals coupled to inputs of said analog multiplexer.

11. A position tracking system, comprising:
stationary signal generating means including at least three fixed- radio frequency transmitting stations in spaced relationship generally symmetrically disposed on a field of interest for generation by each of said transmitting stations a different-frequency cw signal; and mobile receiving means including a radio frequency signal receiver mounted on a mobile unit movable on the field of interest for receiving said different frequency signals, converting the frequency of each of said signals to a common frequency, comparing the phase differences between said common frequency signals, and producing therefrom an output indicative of the location of said mobile unit relative to desired locations on the field of interest.

12. The position tracking system according to claim 11, wherein the signals generated by each of said transmitting stations differ by a constant frequency.

13. The position tracking system according to claim 11, wherein one of said transmitting stations is a master transmitting station transmitting at a fixed frequency $f_1$, and wherein the other of said transmitting stations are slave transmitting stations each transmitting at a fixed frequency offset from said $f_1$ frequency by a different constant frequency.

14. The position tracking system according to claim 13, wherein said slave stations include slave station receiving means for responding to said $f_1$ signal transmitted by said master transmitting station and generating said offset fixed frequency signals.

15. The position tracking system according to claim 14, wherein said slave station receiving means include receiver/frequency synthesizer circuits responsive to said $f_1$ frequency signal.

16. The position tracking system according to claim 11 wherein each of said transmitting stations independently generates said fixed frequency signals.

17. The position tracking system according to claim 11, wherein said mobile receiving means includes signal paths for each of said transmitted signals, and frequency converting means coupled to associated ones of said paths for converting all signals differing from said common frequency to said common frequency.

18. The position tracking system according to claim 17, wherein said frequency converting means includes divide-by-n circuits.

19. The position tracking system according to claim 17, wherein said frequency converting means includes a frequency synthesizer circuit dividing an input signal by a factor of $(1+1/n)$, where n is an integer representing the offset of an associated transmitter frequency from said common frequency.

20. The position tracking system according to claim 17, wherein said mobile receiving means includes phase comparison means for comparing the phase difference between all said common frequency signals.

21. The position tracking system according to claim 20, wherein said mobile receiving means includes an output circuit having an analog multiplexer coupled to an analog-to-digital converter producing a digital computer input signal, and wherein said phase comparison means produces phase difference signals coupled to inputs of said analog multiplexer.

* * * * *